United States Patent
Huggett et al.

(10) Patent No.: US 6,882,549 B2
(45) Date of Patent: Apr. 19, 2005

(54) ACTIVE FILTER FOR POWER DISTRIBUTION SYSTEM WITH SELECTABLE HARMONIC ELIMINATION

(75) Inventors: Colin Huggett, Torrance, CA (US); Gabor Kalman, Palos Verdes, CA (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 09/815,141

(22) Filed: Mar. 21, 2001

(65) Prior Publication Data

US 2002/0136036 A1 Sep. 26, 2002

(51) Int. Cl.$^7$ ............................. H02M 1/12
(52) U.S. Cl. ............................ 363/40; 363/41
(58) Field of Search ................ 363/40, 37, 39, 363/41, 97, 98, 80, 34, 132; 323/207, 209, 210

(56) References Cited

U.S. PATENT DOCUMENTS

| | | | | |
|---|---|---|---|---|
| 3,746,963 A | * | 7/1973 | VeNard, II ................ 363/47 |
| 3,935,551 A | * | 1/1976 | Henniger et al. .......... 333/176 |
| 4,053,820 A | * | 10/1977 | Peterson et al. ........... 363/44 |
| 4,172,234 A | | 10/1979 | Gyugyi et al. |
| 4,467,259 A | | 8/1984 | Duff |
| 4,638,238 A | | 1/1987 | Gyugyi et al. |
| 4,692,855 A | * | 9/1987 | Kuroiwa et al. ........... 363/95 |
| 4,812,669 A | * | 3/1989 | Takeda et al. ............. 307/105 |
| 4,967,334 A | * | 10/1990 | Cook et al. ................ 363/34 |
| 5,047,909 A | * | 9/1991 | Hosoda ...................... 363/40 |
| 5,047,910 A | * | 9/1991 | Levran et al. ............. 363/41 |
| 5,134,356 A | | 7/1992 | El-Sharkawi et al. |
| 5,198,746 A | * | 3/1993 | Gyugyi et al. ............ 323/207 |
| 5,285,029 A | * | 2/1994 | Araki ......................... 187/290 |
| 5,321,598 A | * | 6/1994 | Moran ........................ 363/41 |
| 5,329,221 A | * | 7/1994 | Schauder .................. 323/207 |

(Continued)

FOREIGN PATENT DOCUMENTS

| | | |
|---|---|---|
| FR | 2 779 583 | 12/1999 |
| JP | 58-182474 | 10/1983 |
| JP | 61-142959 | 6/1986 |
| JP | 4-91628 | 3/1992 |
| JP | 9-171414 | 6/1997 |
| JP | 9-233701 | 9/1997 |
| JP | 9-258839 | 10/1997 |
| JP | 2000-139083 | 5/2000 |
| JP | 2000-324696 | 11/2000 |
| WO | WO 89/0689 | 7/1989 |
| WO | WO 00/62396 | 10/2000 |

*Primary Examiner*—Rajnikant B. Patel
(74) *Attorney, Agent, or Firm*—Oral Caglar, Esq.

(57) ABSTRACT

A power distribution system includes an ac power source; a power bus connected to the ac power source; a capacitor bank shunt-connected to the power bus; and an active filter shunt-connected to the power bus. The active filter includes current sensors, an inverter and an inverter control. Each current sensor senses current flowing through a corresponding capacitor of the capacitor bank. The inverter control, in response to the current sensors, controls the inverter to inject harmonic currents into the power bus.

27 Claims, 7 Drawing Sheets

U.S. PATENT DOCUMENTS

| | | | |
|---|---|---|---|
| 5,355,025 A | 10/1994 | Moran et al. | |
| 5,465,203 A | 11/1995 | Bhattacharya et al. | |
| 5,499,178 A * | 3/1996 | Mohan | 363/79 |
| 5,513,090 A * | 4/1996 | Bhattacharya et al. | 363/40 |
| 5,548,165 A * | 8/1996 | Mohan et al. | 307/36 |
| 5,548,203 A | 8/1996 | Kemerer et al. | |
| 5,567,994 A | 10/1996 | Davis et al. | |
| 5,594,630 A | 1/1997 | Baker | |
| 5,648,894 A * | 7/1997 | Dedoncker et al. | 363/40 |
| 5,677,832 A | 10/1997 | Tissier et al. | |
| 5,691,626 A * | 11/1997 | Esser et al. | 323/205 |
| 5,757,099 A | 5/1998 | Cheng et al. | |
| 5,841,268 A | 11/1998 | Mednik | |
| 5,952,817 A | 9/1999 | Brewster et al. | |
| 6,014,017 A | 1/2000 | Weinhold et al. | |
| 6,075,349 A | 6/2000 | Okayama | |
| 6,104,102 A | 8/2000 | Tsuji et al. | |
| 6,115,269 A * | 9/2000 | Gunnarsson et al. | 363/35 |
| 6,201,715 B1 | 3/2001 | Huggett et al. | |
| 6,320,392 B1 * | 11/2001 | Jonsson | 324/623 |

\* cited by examiner

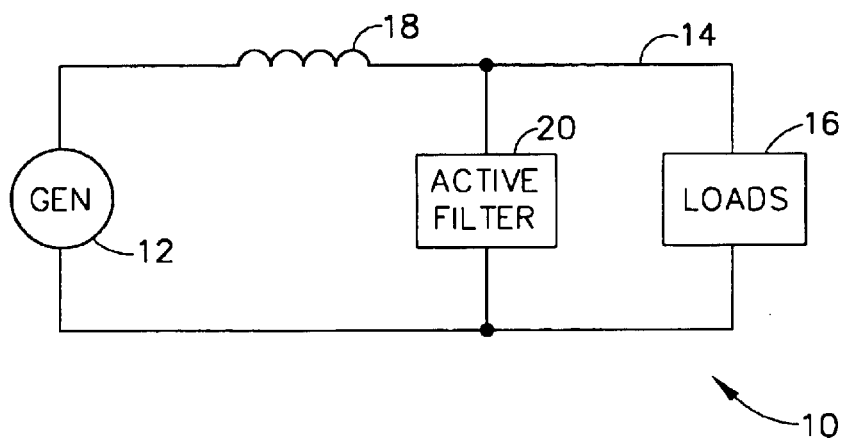
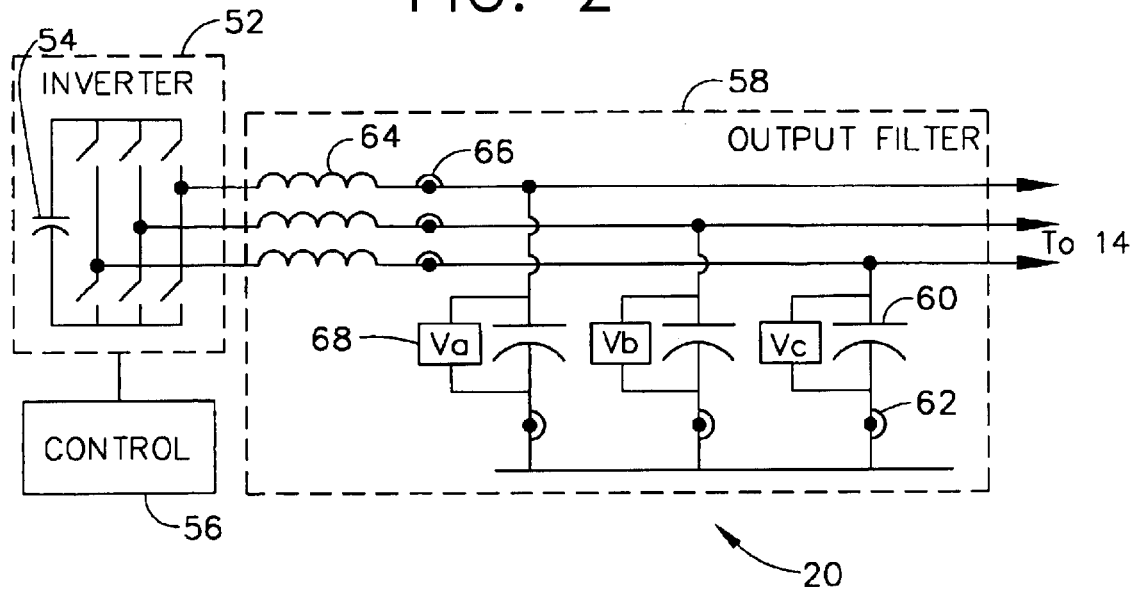

ACTIVE FILTER FOR POWER DISTRIBUTION SYSTEM WITH SELECTABLE HARMONIC ELIMINATION

BACKGROUND OF THE INVENTION

The present invention relates to electrical power distribution systems. More specifically, the present invention relates to a method and apparatus for injecting harmonic currents into constant frequency and variable frequency distribution systems.

Many aircraft include power distribution systems for supplying ac power to loads such as ac-to-dc converters, ac-to-ac converters, on-board electronics, and electromechanical/electrohydrostatic actuators. Many of these loads contain non-linear devices such as bridge rectifiers and inverters.

The non-linear devices can create harmonic currents on the system's power distribution line. The harmonic currents can disrupt other loads connected to system's main power supply (e.g., electrical generators, inverters) and cause malfunction, and even failure, of the other loads.

It would be desirable to remove the harmonic currents without cutting into the power distribution line and measuring main distribution current. In aircraft power distribution systems, the main distribution current can be quite large. For example, a 115/208 volt, three-phase 150 KVA generator has a rated current of approximately 450 amperes.

SUMMARY OF THE INVENTION

According to one aspect of the present invention, a power distribution system includes an ac power source; a power bus connected to the ac power source; a capacitor bank shunt-connected to the power bus; and an active filter shunt-connected to the power bus. The active filter includes current sensors, an inverter and an inverter control. Each current sensor senses current flowing through a corresponding capacitor of the capacitor bank. The inverter control, in response to the current sensors, controls the inverter to inject harmonic currents into the power bus, thus supplying the harmonic current demands of the non linear loads.

BRIEF DESCRIPTION OF THE DRAWINGS

FIG. 1 is an illustration of a power distribution system according to the present invention.

FIG. 2 is an illustration of an active filter for the power distribution system of FIG. 1.

DETAILED DESCRIPTION OF THE INVENTION

Figure 3:
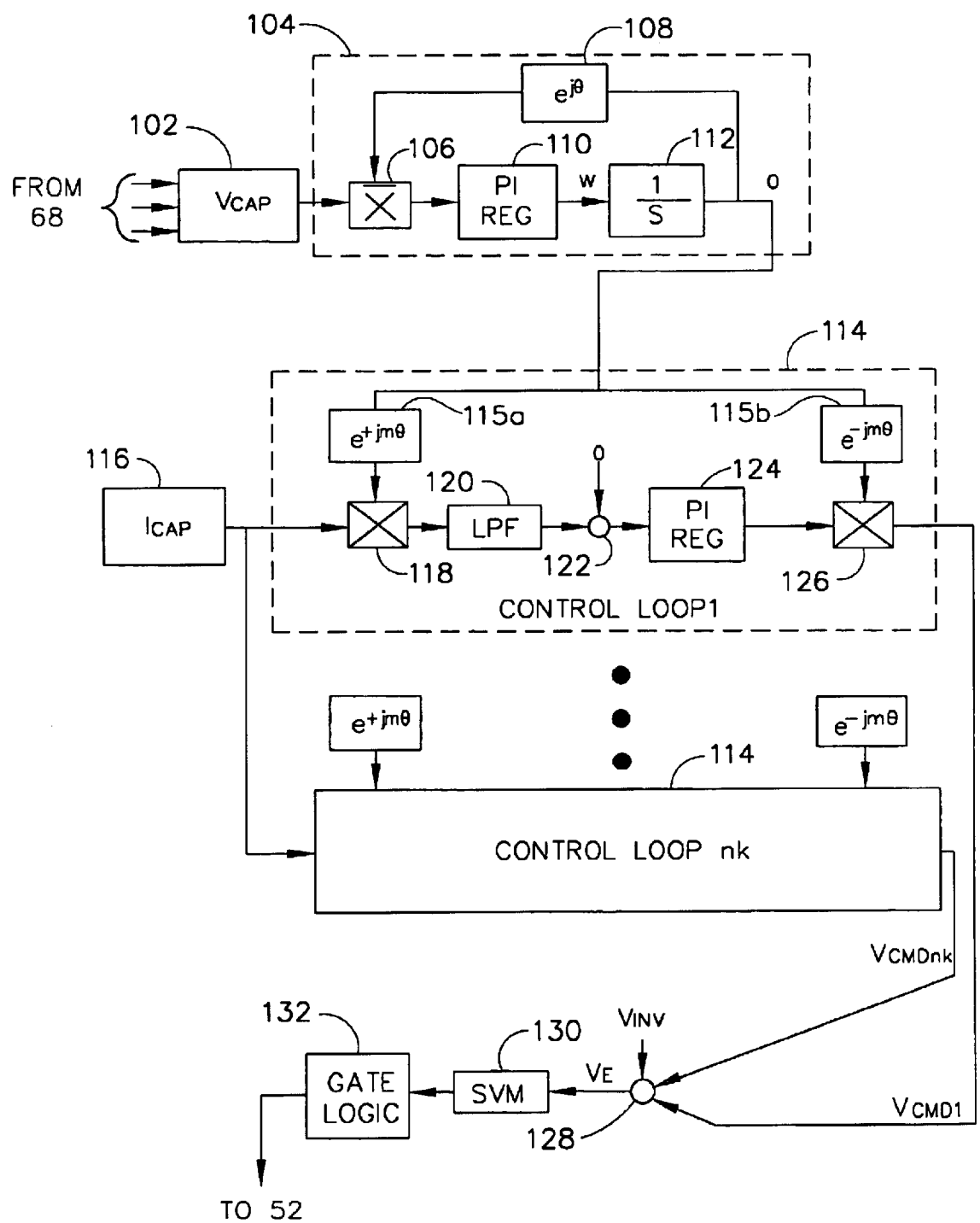
FIG. 3 is an illustration of a control methodology for the active filter.

Reference is made to FIG. 1, which illustrates a single line diagram of a power distribution system 10 for an aircraft. The distribution system 10 includes an ac power source 12 and a power bus 14. The power source 12 provides three-phase ac power to the bus 14 at a fixed or variable fundamental frequency. The fundamental frequency is usually between 350 Hz and 700 Hz.

The ac power source 12 is not limited to any particular type. As an example, the ac power source 12 may include a single high speed permanent magnet generator, an inverter and an inverter control. As another example, the ac power source 12 may include wound field synchronous generators that are controlled to produce a constant output voltage at variable frequency. Yet another example is a variable speed constant frequency (VSCF) source that rectifies generator output voltage to dc, and then converts the dc power to ac power.

Multiple loads are connected to the power bus 14 to receive ac power. These loads are represented collectively by a single block 16. The loads 16 typically include non-linear devices that can give rise to harmonic currents on the power bus 14.

Rectifiers and inverters, which constitute a portion of the non-linear loads, can be modeled as current sources that inject harmonic currents into the power bus 14. The harmonic currents have frequencies that are a multiple of the fundamental frequency of the ac power generated by the power source 12.

An inductor 18 represents the inductance in the power distribution system 10. The inductor 18 also represents source impedance associated with the power sources connected to the power bus 14.

An active filter 20 is shunt-connected to the power bus 14, between the ac power source 12 and the loads 16, upstream of any non-linear loads. The active filter 20 supplies harmonic currents to the non-linear devices such that the ac power source 12 supplies only current at the fundamental frequency to the power bus 14. The frequencies of the harmonic currents are, for example, $(6n\pm1)f$, where f is the fundamental frequency of the ac power generated by the power source 12 and n is an integer. These harmonic currents are referred to as "characteristic" harmonics. Other harmonics can exist, such as those caused by resonant oscillation of filters that are excited by other conducted emissions injected into the power bus 14. These harmonics are referred to as non-characteristic harmonics, since they are not intimately related to the fundamental frequency, as are the characteristic harmonics. The active filter 20 deals with both the characteristic and non-characteristic harmonics.

Reference is now made to FIG. 2. The active filter 20 includes an inverter 52, a dc link capacitor 54 connected in shunt configuration with the inverter 52, an inverter control 56, and an output filter 58. The output filter 58 includes a bank of capacitors 60, current sensors 62 connected in series with the capacitors 60, inductors 64 and inverter current sensors 66.

The capacitors 60 are connected in shunt configuration to the power bus 14. The bank of capacitors 60 is required in aircraft systems to meet power quality and conducted emissions.

In a typical aircraft system, the current flowing through the capacitor current sensors 62 is about 15–20 amps. In contrast, the current flowing through the power bus 14 can reach 500 amps or higher. Sensing the smaller currents in the capacitors 60 gives a much better resolution of the harmonic currents.

The inverter control 56 controls the inverter 52 to inject harmonic currents into the power bus 14 so as to eliminate the harmonic current in the bank of capacitors 60, and to maintain the dc link capacitor 54 at essentially a constant voltage. The inverter 52 may be a conventional six-switch inverter with associated snubbers and diodes, or any other form of voltage controlled inverter.

The control methodology of the inverter control 56 involves Park vectors. Park vectors inherently contain information on both the instantaneous magnitudes and the phase relationship of three phase rotating fields with respect to a reference coordinate system. A Park vector, in general, is a mathematical representation that describes the locus of an electrical quantity in the complex space domain (where time is a parameter). A voltage Park vector is defined with the vector's amplitude and the vector's direction in spatial relation to the three phases. A general discussion of Park vectors is provided in P. K. Kovacs, "Transient Phenomena in Electrical Machines," Elsevier Science Publishing Co. (1984).

Reference is now made to FIG. 3, which shows an exemplary control methodology for the inverter control 56. A Park vector representation of line-to-neutral voltage of the capacitor bank voltage ($V_{CAP}$) is generated from measurements of voltages (Va, Vb, Vc) across each of the capacitors 60 (block 102) (see FIG. 2). Voltage sensors 68 may take these measurements.

The angle ($\theta$) of the capacitor bank voltage Park Vector ($V_{CAP}$) (also referred to as the angle of the fundamental) is estimated from this vector ($V_{CAP}$) by an estimator 104. The estimator 104 performs a vector cross-product multiplication (block 106) of the capacitor voltage Park vector and a complex rotator ($e^{j\theta}$) (block 108). The result of this vector multiplication is operated upon by a PI regulator 110 whose output ($\omega$) is the estimated angular velocity of the capacitor bank voltage Park Vector ($V_{CAP}$). The estimated angular velocity ($\omega$) is integrated (block 112) to produce the estimated angle ($\theta$) of the capacitor bank voltage Park Vector ($V_{CAP}$). This closed loop of the estimator 104 continuously updates the estimate of the angle ($\theta$), thereby reducing the error between the capacitor bank voltage Park vector ($V_{CAP}$) and the complex rotator ($e^{j\theta}$).

The estimated angle ($\theta$) of capacitor bank Park Vector ($V_{CAP}$) is used to derive reference frame rotators of the form $e^{sgn(jm\theta)}$, where harmonic number m=(6n±1). The reference frame rotators are used to transform the capacitor current Park vectors to synchronous reference frames defined by the harmonic number and sequence. If n=1, 2, 3, . . . , nk then a total of 2nk different frame rotators for nk different characteristic harmonics can be computed when their sequence is taken into account. The individual characteristic harmonics can have a positive sequence (where sgn=−1) or a negative sequence (where sgn=+1).

The reference frame rotators ($e^{sgn(jm\theta)}$) (blocks 115a and 115b) are supplied to multiple control loops 114. Each control loop 114 generates a voltage command ($V_{CMD1}$ to $V_{CMDnk}$) that results in a harmonic voltage being generated to eliminate the sensed characteristic harmonic currents in the bank of capacitors 60. A separate control loop 114 is provided for each harmonic current that is to be eliminated. For example, five control loops would be provided to eliminate five different harmonic currents in the bank of capacitors 60. (Not all harmonics and associated sequences are required to be eliminated in a specific application; only those harmonics that are desired to be eliminated will be selected for a specific application.)

Each control loop 114 receives the Park vector ($I_{CAP}$) representing current in the bank of capacitors 60. The current Park vector ($I_{CAP}$) may be computed (block 116) from the currents measured in the capacitor bank by the series-connected set of current sensors 62.

Within each control loop 114, the current Park vector ($I_{CAP}$) is transformed to a reference frame that is synchronous with respect to the positional angle m$\theta$ (where m is the harmonic number, and theta is the estimated angle of the fundamental). The transformation to the synchronous reference frame may be performed by multiplying (block 118) the current Park vector ($I_{CAP}$) with the complex rotator $e^{sgn(jm\theta)}$ (block 115a). The resulting synchronous vector in the m$^{th}$ synchronous reference frame is passed through a low pass filter 120, which filters out all frequencies and leaves a dc value representing the specific harmonic in its appropriate reference frame. For example, the fifth harmonic (n=1, m=5) viewed in the fifth harmonic reference frame will be represented by a dc value. The filtered signal (in the form of a dc voltage) is compared to a zero reference (block 122). The resulting error, which represents the difference between the desired value of the m$^{th}$ harmonic (typically zero), and the computed value in its appropriate reference frame, is operated upon by a vector PI regulator 124, whose output produces the voltage vector required to eliminate the specific harmonic. This voltage vector is then transformed back (block 126) to the stationary frame by multiplying by the complex rotator $e^{-sgn(jm\theta)}$ (block 115b). Resulting is a voltage Park vector (command $V_{CMDm}$) representing the mth harmonic voltage required to generate the m$^{th}$ harmonic current in the inverter 52, which cancels the m$^{th}$ harmonic current in the bank of capacitors 60.

The voltage Park vectors ($V_{CMD1}$ to $V_{CMDnk}$) from the control loops 114 are summed (block 128) with a Park vector ($V_{INV}$) representing inverter fundamental voltage. The sum is used as a voltage command ($V_E$) for Space Vector Modulation (SVM) logic 130. The SVM logic 130 uses space vector modulation to command gate logic 132 to turn on and off the switches of the inverter 52. The switches of the inverter 52 may be modulated at a high frequency (e.g., 100 kHz) in order to minimize the size of the capacitors 60 and to enable compensation of characteristic harmonics up to a frequency that is limited by the modulation frequency.

The inverter control 56 described thus far does not contain protection to the inverter 52 with respect to overcurrent. Therefore an additional control loop is added to provide this overcurrent protection without introducing additional harmonics.

Figure 4:
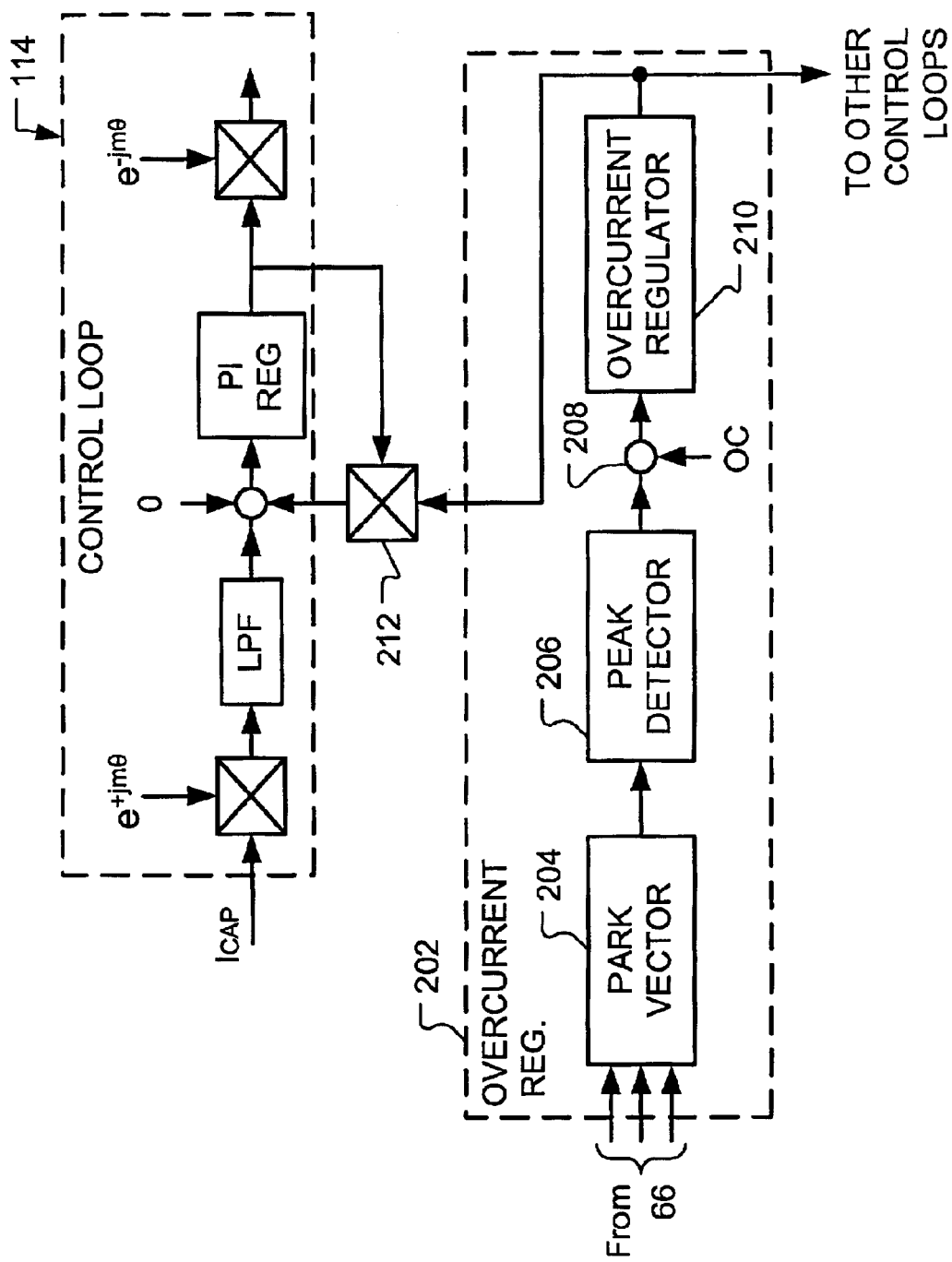
FIG. 4 is an illustration of an overcurrent regulator for the active filter.

Reference is now made to FIG. 4, which shows an exemplary control methodology for limiting current to the inverter 52. An overcurrent regulator 202 includes a block 204 for computing a Park vector representing current flowing through the inverter 52 (using the currents measured by the inverter currents sensors 66) and a peak current amplitude detector 206 that monitors the magnitude of the inverter current Park vector. The peak detector 206 stores the maximum or peak value of the magnitude of the inverter current Park vector. At a summing junction 208 an output of the peak detector 206 is compared to an overcurrent reference (OC), and the resulting error signal is operated upon by a PI regulator 210. An output of the PI regulator 210 is then applied to a plurality of multipliers 212, each of which is connected around their respective control loops 114. As the output of the PI regulator 210 increases, the gain of each control loop 114 is reduced, providing droop to each of the control loops 114 and causing the control loops 114 to reduce the amount of harmonic attenuation, thereby reducing the inverter current. In this way, a linear reduction in the harmonic attenuation is achieved without generating additional harmonics.

This single overcurrent regulator 202 can control the droop in all control loops 114 in a parallel or sequential manner so as to provide overcurrent protection to the inverter 52.

Figure 5:
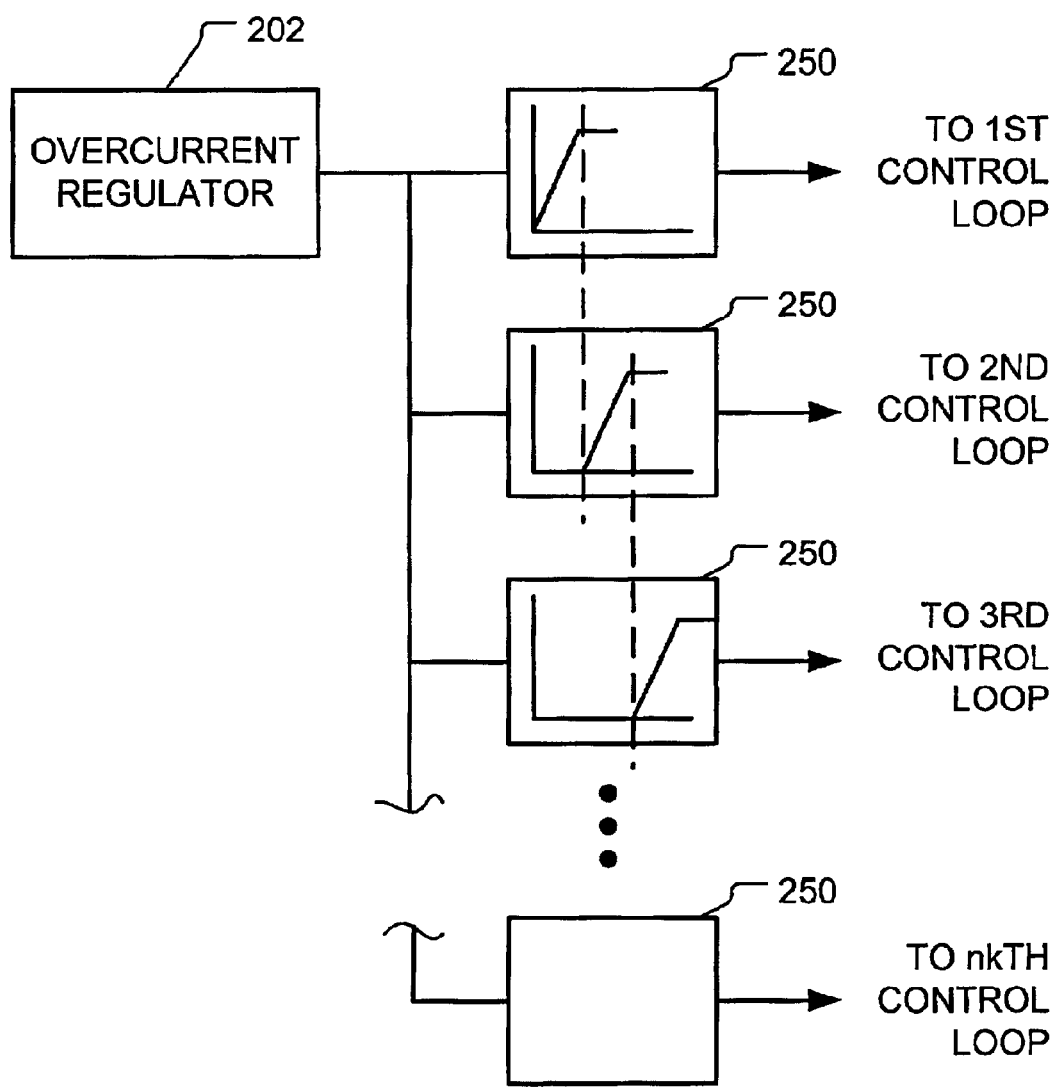
FIG. 5 is an illustration of an overcurrent regulator that operates sequentially on control loops of the active filter.

FIG. 5 shows an overcurrent regulator 202 that operates sequentially on the control loops. The output signal of the overcurrent regulator 202 is supplied in parallel to a series of blocks 250. As the output signal from the overcurrent regulator 202 increases from zero, each block 250 increases its output signal by a proportional value, until a limit is reached. When the limit is exceeded, each block 250 outputs a maximum value. The outputs of the blocks 250 are progressively delayed such that the first block 250 outputs a signal to the multiplier 212 associated with the first control loop, then second block 250 outputs a signal to the multiplier 212 associated with the second control loop, then the third block 250 outputs a signal to the multiplier 212 associated with the third control loop, and so on until the multiplier 212 associated with the $nk^{th}$ control loop receives a signal. Each multiplier 212 is connected around its associated control loop.

Each block 250 has a different initiation level for control, so that sequential operation is achieved. The advantages of such a scheme are that low order harmonic currents, which usually have the highest amplitude, can be attenuated at the expense of other higher order harmonics.

A stable and controlled voltage should be maintained on the dc link capacitor 54. Two different controls 302 and 402 for maintaining the stable and controlled voltage are shown in FIGS. 6 and 7.

Figure 6:
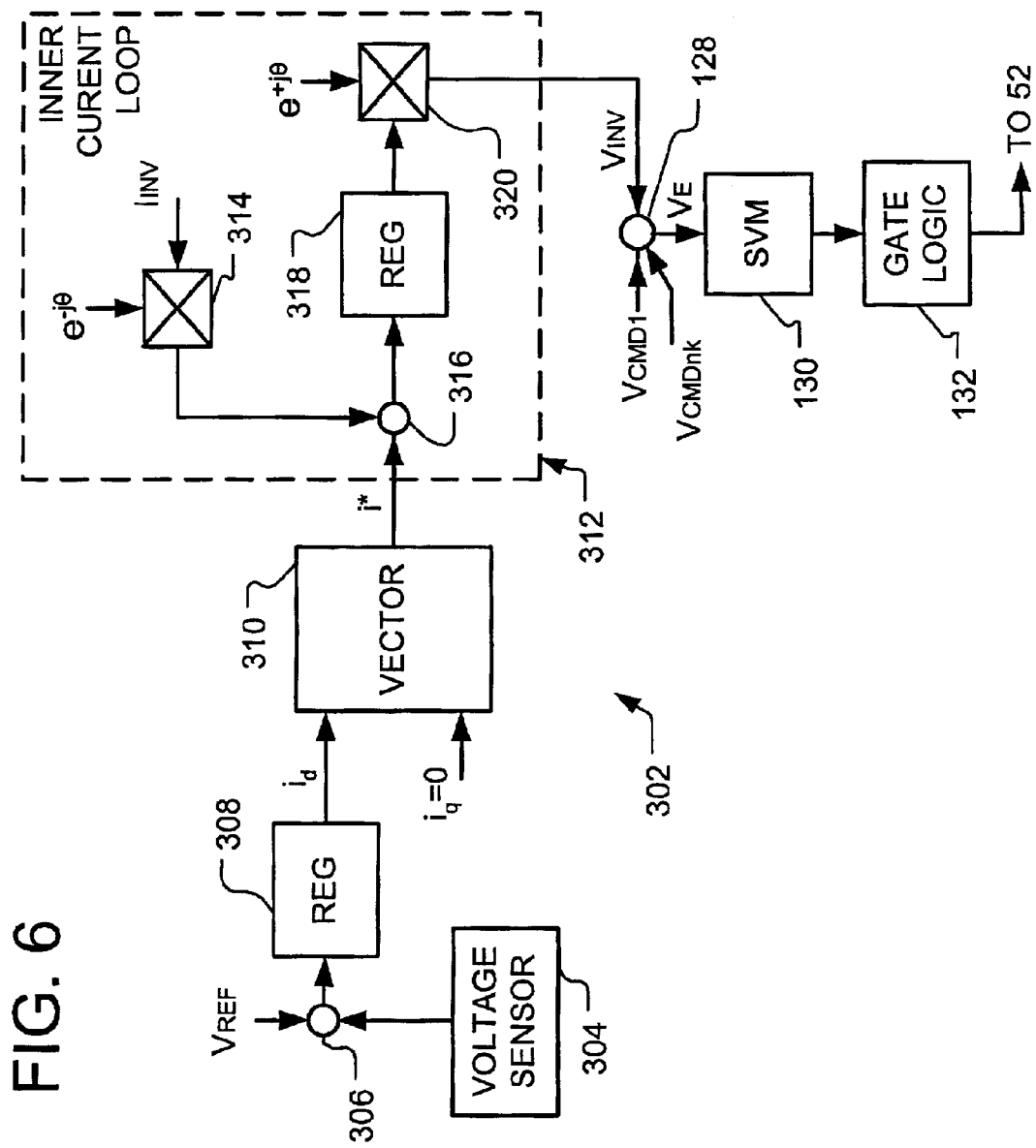
FIGS. 6 and 7 are illustrations of two different voltage controls for a dc link capacitor of the active filter.
Figure 7:
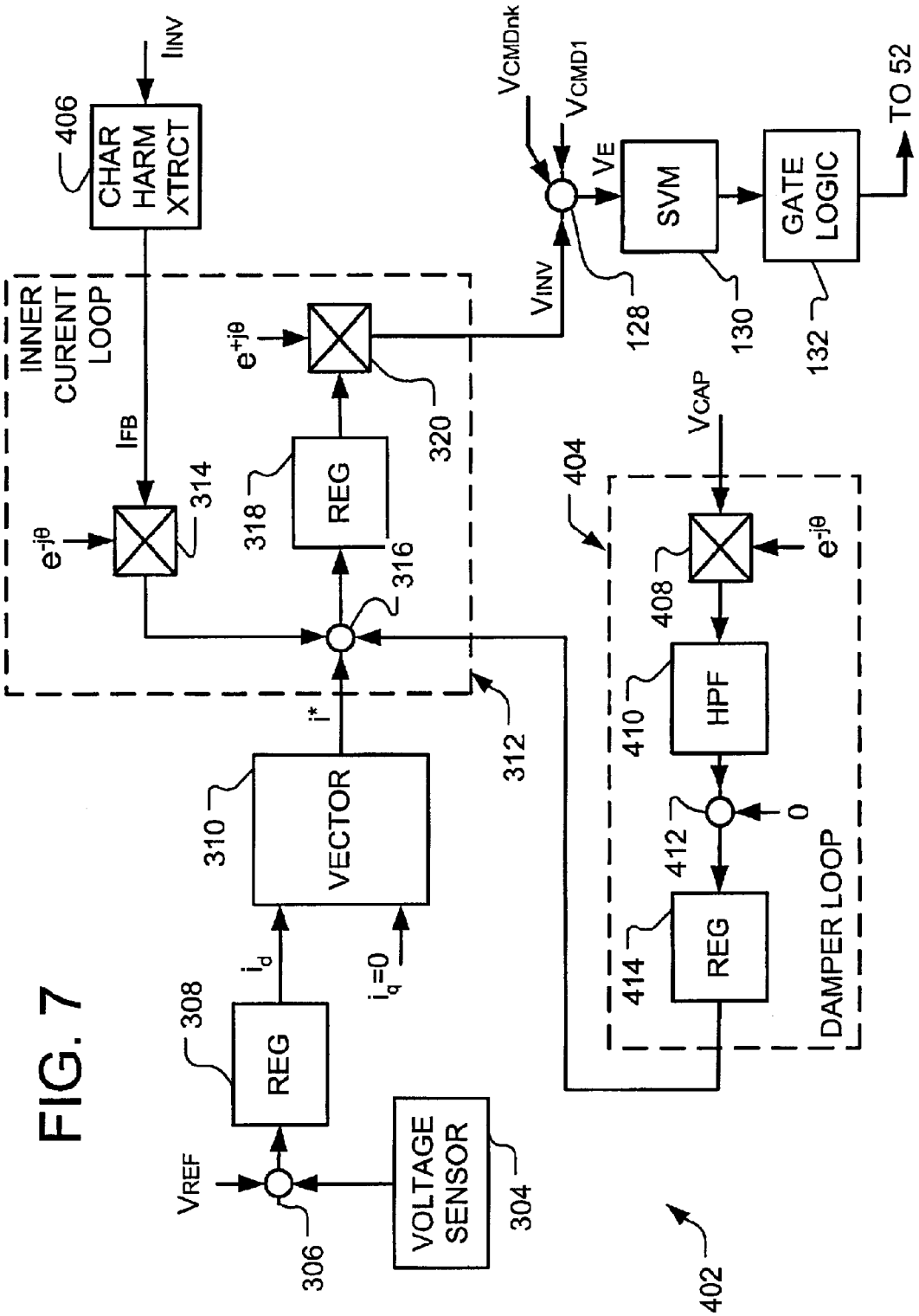

Referring to FIG. 6, a first control 302 includes a sensor 304 for measuring voltage on the dc link capacitor 54 and a summing junction 306 for comparing a reference voltage ($V_{REF}$) to the measured dc link capacitor voltage. The resulting error is operated upon by a PI regulator 308, whose output corresponds to the direct-axis (real) component (id) of an inverter vector command (i*). The complete vector command (i*) is constructed by combining a zero quadrature-axis current component (iq=0) with the direct axis component (block 310).

An inner current loop 312 regulates the inverter current to maintain a stable and controlled voltage on the dc link capacitor 54. The inverter current ($I_{INV}$), represented by the Park vector created from the currents measured by the inverter current sensors 66, is transformed to the fundamental reference frame by multiplying the inverter Park vector ($I_{INV}$) by $e^{-j\theta}$ (block 314).

This transformed vector is subtracted from the inverter vector command (i*) at a summing junction 316, and the resulting error signal is operated upon by a PI current regulator 318. The output of the current regulator 318 is transformed back to the stationary reference frame by multiplying current regulator output by $e^{+j\theta}$ (block 320). The transformed output ($V_{INV}$) is summed with the voltage commands ($V_{CMD1}$ through $V_{CMDnk}$) at a summing junction 128 and an output of the summing junction 128 is supplied to the SVM logic 130.

The SVM logic 130 performs space vector modulation by commanding the gate logic 132 to select inverter switches that create a rotating voltage vector. The rotating vector produces a sinusoidal current that best matches the commanded inverter current. Typical SVM algorithms may be used to compute duty cycles and select appropriate voltage vectors or the null vector so that the time-averaged vector produced approximates the commanded voltage vector.

Two problems can occur in the control 302 of FIG. 6. First, there exists an undamped filter comprised of the inductance 18 associated with the distribution system and the source impedances of the loads, and the capacitors 60 in the capacitor bank of the output filter 58. Second, the inner current loop 312 associated with the DC link voltage regulator 302 interferes with the control loops 114.

Reference is now made to FIG. 7, which shows a control 402 that can overcome these two problems. The control 402 includes a damper loop 404 and a characteristic current harmonic extractor 406.

The damper loop 404 provides active damping to the resonance of the capacitors 60 of the capacitor bank and external inductance, and the characteristic harmonic extractor 406 removes all characteristic harmonics from the inverter current Park vector so that the multiple control loops 114 and the inner current loop 312 do not interfere with one another. In this manner, interaction between the multiple control loops is eliminated.

The damper loop 404 takes the capacitor bank voltage Park vector ($V_{CAP}$), and transforms this vector to the fundamental frequency reference frame (block 408). The resulting signal is passed through a high pass filter 410, which passes the high frequency signals representing the resonant voltage superimposed upon the fundamental. This is compared to a zero reference signal at summing junction 412, and the resultant signal operated upon by a damper regulator 414. The damper regulator 414 attenuates any resonance that could be caused by extraneous excitation exciting the output capacitor. The output of the damper regulator 414 is summed with the current Park vector command at the summing junction 316. The damper loop 404 does not impact the gain of the inner current loop 312; its function is damp out non-characteristic oscillations on the capacitors 60 of the capacitor bank.

Figure 8:
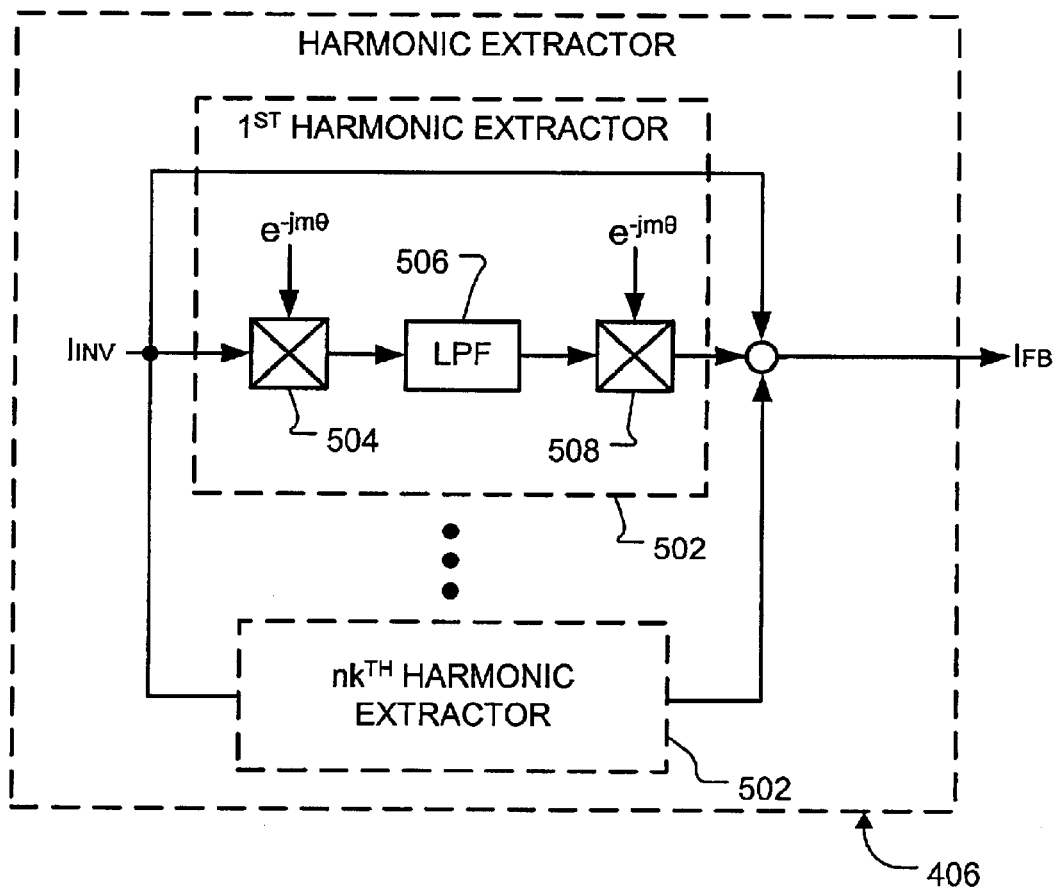
FIG. 8 is an illustration of a harmonic extractor.

FIG. 8 shows the characteristic harmonic extractor 406 in greater detail. For each harmonic that is regulated by the control loops 114, there is a corresponding block 502 in the harmonic extractor 406. Thus an $m^{th}$ harmonic extractor block 502 will be provided for the $m^{th}$ harmonic. Each harmonic extractor block 502 performs a co-ordinate transformation upon the inverter current Park vector ($I_{INV}$) with respect to the appropriate harmonic frequency and sequence (block 504), low-pass filters the resulting signal (block 506), converts the filtered signal back to the stationary reference frame (block 508), and subtracts the $m^{th}$ harmonic current Park vector from the sensed inverter current Park vector ($I_{INV}$). The transformation and low pass filtering effectively allow the removal of the harmonic currents from the inverter current Park vector ($I_{INV}$), thereby eliminating the possibility of interaction between the multiple loops.

Thus disclosed is a method and apparatus for dealing with harmonic currents in variable frequency distribution systems. The method and apparatus allow a main power source to provide ac power having a purely sinusoidal waveshape.

Because currents are sensed in the capacitor banks instead of the power line, the sensing of lower currents allows for greater resolution of the harmonic currents. It also allows smaller current sensors to be used. Moreover, the harmonic currents are dealt with without cutting into the main distribution system.

Current limiting eliminates harmonic currents that exceed the rating of the inverter. Moreover, inverter current-limiting can be performed without introducing additional harmonics due to the implementation of current limit function.

Parallel operation of multiple active filters does not require any additional circuitry, or information transfer between the inverters. The sensing of current in the capacitor bank ensures balance between all inverters; unbalance is determined solely by the tolerance of the output capacitors.

The selection of harmonics to be eliminated is programmable, as is their sequence.

Active damping is provided. Bulk filter, control loop bandwidth and modulation frequency are all optimized.

Although the system is described in connection with three-phase ac power, it is not so limited. The system may instead utilize two-phase ac power.

Although the power distribution system has been described as a variable frequency system, it is not so limited. The power distribution system may be a constant frequency system. The method and apparatus may be applied to any frequency system (including dc systems).

Although the power distribution system has been described in connection with an aircraft distribution system, it is not so limited. The power distribution system may be used in military, space and industrial applications.

The active filters may be used to remove harmonic currents from a voltage source including a single generator or multiple generators operating in parallel.

The PI regulators of the active filters may be scalar regulators when appropriate synchronous reference frames are used. In the alternative, complex regulators in the stationary reference frame may be used. A single complex regulator would be used in a stationary frame for each harmonic current.

The inverter control may be implemented in hardware, software or any combination of the two. For example, the inverter control may be implemented as a digital signal processor.

The power distribution system is not limited to SVM logic for turning on and off the switches of the inverter. Other vector modulation schemes may be used.

The present invention is not limited to the specific embodiments described above. Instead, the present invention is construed according to the claims that follow.

What is claimed is:

1. A power distribution system comprising:
   an ac power source;
   a power bus connected to the ac power source;
   a capacitor bank shunt-connected to the power bus; and
   an active filter shunt-connected to the power bus, the active filter including an inverter, an inverter control and current sensors, each current sensor sensing current flowing through a corresponding capacitor of the capacitor bank, the inverter control, in response to the current sensors, controlling the inverter to inject harmonic currents into the power bus.

2. The system of claim 1, wherein the inverter control controls the inverter to inject harmonic currents so as to eliminate harmonic currents in the capacitor bank.

3. The system of claim 1, wherein the harmonic currents are characteristic harmonic currents.

4. The system of claim 1, wherein the active filter supplies harmonic currents such that the ac power source supplies current to the power bus at a fundamental frequency only.

5. The system of claim 1, wherein the active filter includes a plurality of control loops, each control loop causing the filter to inject a different harmonic current into the power bus.

6. A power distribution system comprising:
   an ac power source;
   a power bus connected to the ac power source;
   a capacitor bank shunt-connected to the power bus;
   an active filter shunt-connected to the power bus, wherein the active filter includes an inverter, an inverter control and current sensors, each current sensor sensing current flowing through a corresponding capacitor of the capacitor bank, the inverter control, in response to the current sensors controlling the inverter to inject harmonic currents into the power bus; and
   wherein the active filter further includes a plurality of contol loops, each control loop causing the filter to inject a different harmonic current into the power bus, wherein each control loop generates a voltage command corresponding to a characteristic harmonic, and wherein the active filter further includes means for summing the voltage command with a command corresponding to inverter voltage, and vector modulation logic, responsive to an output of the summing means, for controlling the inverter.

7. The system of claim 6, wherein the active filter derives reference frame rotators of the form $e^{sgn(jm\theta)}$, where $m=(6n\pm1))$, different rotators being used by different control loops.

8. The system of claim 6, wherein each loop is responsive to a positive or negative sequence angle of the Park vector of capacitor bank current.

9. The system of claim 6, wherein within each control loop, the current Park vector is transformed to a reference frame that is synchronous with respect to positional angle $(6n\pm1)\theta$ of the fundamental; the resulting synchronous vector in the $m^{th}$ synchronous reference frame is passed through a low pass filter, which filters out all frequencies; and the filtered signal is supplied to a PI regulator, which provides the voltage command for generating the corresponding harmonic current.

10. The system of claim 6, wherein the active filter further includes an inverter overcurrent regulator.

11. The system of claim 10, wherein the overcurrent regulator changes gain of the control loops in inverse proportion to an increase in overcurrent.

12. The system of claim 11, wherein overcurrent regulator operates on the control loops in parallel.

13. The system of claim 11, wherein overcurrent regulator operates on the control loops sequentially.

14. The system of claim 1, further comprising a dc link capacitor coupled across the inverter, wherein the inverter control also controls the inverter to maintain the dc link capacitor at essentially a constant and stable voltage.

15. The system of claim 14, wherein the inverter control generates an inverter vector command having a zero quadrature-axis component and a direct-axis component derived from dc link capacitor voltage; and includes an inner loop for regulating measured inverter current according to the inverter vector command.

16. The system of claim 15, wherein the inverter control includes a damping loop for modifying the inner loop to damp out non-characteristic oscillations on the capacitor bank.

17. The system of claim 16, wherein the inverter control further removes harmonic currents from a Park vector representing the measured inverter current.

18. An active filter for a power distribution system, the system including a power bus, the filter comprising:
   an inverter;
   means for generating a plurality of different voltage commands wherein the voltage commands are in response to a voltage of a capacitor bank, each voltage command corresponding to a different harmonic current;
   means for summing the different voltage commands with a voltage command representing inverter voltage; and
   means, responsive to the summing means, for controlling the inverter to function as a current controlled-current source that injects harmonic currents into the power bus such that the voltage on the power bus contains only a fundamental component.

19. An active filter for a power distribution system, the system including a power bus and a capacitor bank shunt-connected to the power bus, the filter comprising:

an inverter; and a plurality of control loops, each control loop corresponding to a different multiple of capacitor bank Park Vector angle, each control loop causing the inverter to inject a different harmonic current into the power bus.

20. An active filter for a power distribution system, the system including a power bus and a capacitor bank shunt-connected to the power bus, the filter comprising:

an inverter;

a plurality of control loops, each control loop corresponding to a different multiple of capacitor bank Park Vector angle, each control loop causing the inverter to inject a different harmonic current into the power bus; and an inverter overcurrent regulator for changing gain of the control loops in inverse proportion to an increase in overcurrent.

21. The active filter of claim 20, wherein each control loop generates a voltage command corresponding to a characteristic harmonic, and wherein the active filter further comprises means for summing the voltage command with a command corresponding to inverter voltage, and vector modulation logic, responsive to an output of the summing means, for controlling the inverter.

22. The active filter of claim 20, wherein within each control loop, a Park vector representing capacitor bank current is transformed to a reference frame that is synchronous with respect to positional angle $(6n\pm1)\theta$ of the fundamental; the resulting synchronous vector in the $m^{th}$ synchronous reference frame is passed through a low pass filter, which filters out all frequencies; and the filtered signal is supplied to a PI regulator, which provides the voltage command for generating the corresponding harmonic current.

23. The filter of claim 20, further comprising a dc link capacitor coupled across the inverter, the dc link capacitor providing power to the inverter; and an inverter control for controlling the inverter to maintain the dc link capacitor at essentially a constant and stable voltage.

24. The active filter of claim 20, further comprising an inverter control for generating an inverter vector command having a zero quadrature-axis component and a direct-axis component derived from dc link capacitor voltage; and an inner loop for regulating measured inverter current according to the inverter vector command.

25. The active filter of claim 24, wherein the inverter control includes a damping loop for modifying the inner loop to damp out non characteristic oscillations on the capacitor bank; and logic for removing harmonic currents from the measured inverter current Park vector.

26. A method of using an inverter to filter harmonic currents on a power bus of a power distribution system, a capacitor bank being shunt-connected across the power bus, the method comprising:

measuring currents flowing through the capacitors of the capacitor bank; and controlling the inverter to inject harmonic currents into the power bus in response to the measured currents so that the inverter supplies harmonic current demands of non linear loads on the power bus.

27. The method of claim 26, wherein voltage commands corresponding to multiple characteristic harmonics are generated, and wherein the voltage commands are summed with a command corresponding to inverter voltage, and wherein the inverter is vector-modulated in response to the sum.

* * * * *